United States Patent Office 3,655,843
Patented Apr. 11, 1972

3,655,843
MANUFACTURE OF DISPOSABLE CERAMIC DISHES FROM HIGH ALKALI PYROPHYLLITE
Fred G. Simmen, East Liverpool, Ohio, assignor to Hall China Company, East Liverpool, Ohio
No Drawing. Filed Oct. 27, 1969, Ser. No. 869,896
Int. Cl. C04b 33/24, 33/28, 33/34
U.S. Cl. 264—59
7 Claims

ABSTRACT OF THE DISCLOSURE

Thin walled ceramic articles for single-use, or throwaway type, that are tough, strong and capable of rapid heating in high temperature ovens are made by applying to a heat-consumable substrate a thin layer of a low density, high viscosity aqueous slip consisting essentially of white ware grade pyrophyllite that is resistant to wetting and undergoes zero, or substantially zero, shrinkage on drying, drying the deposited slip layer on the substrate, applying glaze to the upper dried surface, and firing to mature the article and glaze and ash or otherwise consume the substrate.

---

The invention relates to single-use, or throw-away ceramic articles. Among its objects are to provide such articles capable of withstanding rapid heating in high temperature ovens, which when glazed are strong and tough enough to resist breaking under strong pressure of a steak knife, are especially adapted to food service uses, and may be made easily and inexpensively by ordinary ceramic spray machine equipment.

A further object is to provide a one-fire method of making such articles by applying a slip of pyrophyllite of unique type to a heat-consumable substrate, at least partially drying the applied slip in place, applying glaze to the exposed dried surface, and maturing the slip and glaze with elimination of the substrate by the maturing heat, which is easily practiced with standard ceramic equipment.

Other objects will appear from the following specification.

Single-use ceramic articles must be inexpensive and for that reason they must be thin walled for economy of raw materials and to permit low shipping costs. For food use vessels of that type must also be glazed and be strong enough to permit handling and the cutting of food by a fork or a steak knife without breakage. At the same time they must be strong enough to withstand rapid heating in high temperature ovens. Thin sections provide for rapid heat transfer and superior thermal shock resistance.

Conventional ceramic forming methods are not applicable to production of thin walled vessels because they are fragile if cast, jiggered, or pressed, with the result that high manufacturing losses or high labor costs are inherent in the delicate handling required. On the other hand, conventional slip casting compositions are not applicable to forming on a consumable substrate because upon drying they crack severely into patterns reminiscent of dried out mud puddles. Conventional slip casting practices require, on the other hand, the occurrence of shrinkage upon drying in order to obtain mold release after forming and drying.

The invention is predicated upon my discovery that its stated objects are attained by applying an aqueous slip of a particular and special kind to a heat-consumable substrate shaped to form the article, at least partially drying the applied slip on the substrate, applying glaze to the dried surface, and heating the substrate with the dried layer of slip to mature the slip and glaze while consuming the substrate by the maturing heat.

Experience has shown that the ceramic material, or minerals conventionally used for slip casting are inapplicable to the practice of the invention because upon drying the shrinkage is so great as to prevent the production of useful thin-walled bodies. For the purposes of the invention it is critical that the layer of slip applied to the heat-consumable substrate undergo zero, or substantially zero, shrinkage upon drying.

Experience with many slip casting compositions of the type conventionally used showed that they fail to meet the criterion. Although I have developed ceramic compositions of low shrinkage useful as crack fillers in the reclaiming of slip cast production articles, they are unsuited to the purposes of the present invention because they use minerals that are so expensive as to preclude their use in the production of inexpensive single-use, throw-away articles; moreover those minerals may be unobtainable in sufficient quantities for mass production because of world trade conditions.

I have discovered that in the practice of the invention it is critical to use a relatively inexpensive and readily available grade or type of pyrophyllite characterized by being difficultly wettable and which forms slips of much higher viscosity, e.g., 4,000 to 16,000 centipoises, than that of conventional casting slips (200 to 1200 centipoises). As is well known by those in the ceramic industry, there are two basic types of pyrophyllites. One is called a low alkali or refractory grade because it contains less than .5 percent alkali. The other type is called a high alkali or white ware grade because it contains several times the amount of alkali found in the refractory grade; e.g., at least 2 percent in the white ware grade.

The only pyrophyllite that I have found to be wholly satisfactory is a high alkali white ware grade, or type, sold by the General Minerals Company as SC200; it provides the unique characteristics essential to the practice of the invention. The percentage of alkali in SC200 pyrophyllite ranges between about 2.1 and 3.1. This material substantially completely passes a 200-mesh Tyler sieve, and as indicated above it is difficultly wettable and forms slips of unusually high viscosity, much higher than usual in slip casting. An analysis of SC200 shows the following ranges:

| | Percent | |
|---|---|---|
| $SiO_2$ | 73.0 | 69.5 |
| $Al_2O_3$ | 20.4 | 22.7 |
| $Fe_2O_3$ | 0.6 | 0.6 |
| $K_2O$ | 0.9 | 1.4 |
| $Na_2O$ | 1.2 | 1.7 |
| Loss on ignition | 3.9 | 4.2 |

Moreover, the pH of this type of pyrophyllite is close to 7 so that deflocculants have little or no effect upon it, and nonionic wetting agents likewise have no dispersing effect. However, slips useful in the practice of the invention can be prepared readily and relatively quickly by the use of high-energy high-shear mixers such as are used in the paint and food industries, for instance mixers of the Shar type.

A system of SC200 pyrophyllite and water is all that is required to produce this dispersion. Some advantage may be obtained by using Darvan as a deflocculant to hasten the mixing process, and the addition of a binder material such as sodium carboxymethylcellulose or colloidal magnesium silicate can be made to the dispersed material to improve dry strength of the product prior to firing. As far as I am aware this type of pyrophyllite has been used heretofore only in dry process forming methods as a major body constituent.

Not only is the SC200 material relatively inexpensive but also no flux is needed to mature it, e.g., at cone 10. For the purposes of the invention relatively low specific gravity slips are used, and in general the specific gravity may range from about 1.6 to 1.7 in comparison with the typical conventional casting slips the specific gravity of which ranges from about 1.75 to 1.85. Slips useful for the invention contain about 47.5% to 70% by weight of water based on the dry mineral (low density slips); experience in slip casting would lead to the belief that such slips would exhibit excessive drying shrinkage, although my tests have shown that zero, or substantially zero, shrinkage is encountered in the practice of the invention.

An advantageous feature of the invention is that these slips are self-leveling when wet sprayed on the heat-consumable substrates of the invention so that it is possible to form vessels having vertical or sloping side walls of smooth and uniform surface without runs or ripples. This property and the absence of shrinkage upon drying of relatively thin layers upon the substrate may be due to the fact that the SC200 pyrophyllite is composed pyrophyllite and quartz as the major constituents with minor amounts of muscovite mica and kaolin present. All but the quartz have a plate-like structure which tends toward a parallel alignment of the particles with the substrate surface with the development of an optimum packed structure so oriented that when dried shrinkage is absent, which confers shape and size stability upon the fired vessel.

Paper is the preferred substrate for the practice of the invention, and satisfactory results, especially in the production of food vessels, are to be had with the type of paper used for the display and sale of such food items as meat, vegetables and fruits. This material can be formed into food service articles of the various types and sizes contemplated by the invention. Plastics which are completely consumed in the firing process may be used also.

The aqueous pyrophyllite slip is sprayed in customary way upon the substrate. The slip may, of course, be applied in other ways, as by dipping. The slip may be applied in an amount according to the wish of the customer so that fired vessel will have the desired thin wall thickness. After the slip has been applied to the substrate and dried, the upper surface is supplied with a glazing composition and the whole is fired to mature the slip and glaze, e.g., as by firing to about Cone 10, or about 2200° F. In so doing the substrate is burned off.

For food use the vessels of this invention may have a thickness of body-plus-glaze ranging from about 0.075" to 0.125" and have the strength property requisite for such use. Such thicknesses are strong enough for the purpose yet may be destroyed readily by crushing, and the crushed fragments may be used for various purposes, as for driveways as aggregate and related purposes, so that further economy results from the practice of the invention because the used vessels need not be discarded.

Such thin wall articles are sensitive to mismatch between body and glaze so that the thermal expansion of the glaze should match, or closely match that of the body. The glaze also should be a composition compatible with the body material to insure a stress-free structure upon firing. This may be accomplished by incorporating pyrophyllite as a replacement for clay and flint in a conventional glaze formula although the same result may, of course, be achieved in other ways.

In some one-use practice the food is frozen in place in the vessel and when it is to be served the vessel and contents are heated quickly in electronic, radiant, or high convection oven providing high heat rapidly.

Other pyrophyllites are dispersed more easily than the SC200 type to give slips of lesser viscosity but although some of them may show very low shrinkage upon drying they are not useful for making food vessels because they are not glazable or do not mature to a condition of acceptably low water absorption or lack the self-leveling property.

I claim:

1. That method of making a thin walled article comprising the steps of preparing an aqueous self-leveling slip consisting essentially of water and white ware grade pyrophyllite characterized by an alkali content between about 2.1 and 3.1 percent and by high resistance to wetting, the slip having a viscosity in excess of 1200 centipoises and a specific gravity less than about 1.75 but at least about 1.6, the drying shrinkage of the slip being essentially zero, applying a thin layer of the slip to one side of a heat-consumable substrate, drying the slip on the substrate, and then heating the layer on the substrate to mature said layer while consuming the substrate by the firing heat, the substrate determining the shape of the fired article.

2. A method according to claim 1, in which said slip viscosity is between 4,000 and 16,000 centipoises.

3. That method of making a thin walled article suitable for use as a single-use food vessel comprising the steps of preparing an aqueous self-leveling slip having a specific gravity between about 1.6 and 1.7 and a viscosity in excess of 1200 centipoises, the slip consisting essentially of water and a white ware grade pyrophyllite characterized by an alkali content between about 2.1 and 3.1 percent and by high resistance to wetting, the drying shrinkage of the slip being essentially zero, applying a thin body layer of the slip to one side of a heat-consumable substrate of a predetermined shape, at least partially drying the slip on the substrate, applying to the exposed surface of the dried body layer a glaze that closely matches the thermal expansion of the body layer, and then heating the substrate to mature said layer and glaze while consuming the substrate by the firing heat, the substrate determining the shape of the fired article which is capable of withstanding rapid heating in a high temperature oven.

4. A method according to claim 3, said slip containing about 47.5 to 70 percent by weight of water based on the dry weight of the pyrophyllite, and the substrate and dried layer being heated to about 2200° F.

5. A method according to claim 3, in which said slip viscosity is between about 4,000 and 16,000 centipoises.

6. A method according to claim 3, in which essentially all of said pyrophyllite is less than 200-mesh, the slip contains about 75 percent by weight of water based on the dry weight of the pyrophyllite, and the fired article is of the order of 0.1 inch thick.

7. A method according to claim 6, in which said slip viscosity is between 4,000 and 16,000 centipoises.

References Cited

UNITED STATES PATENTS

| | | | |
|---|---|---|---|
| 2,270,075 | 1/1942 | Miller | 264—87 |
| 2,380,198 | 7/1945 | Sproat | 106—45 |
| 2,543,548 | 2/1951 | Henry et al. | 106—67 |
| 2,799,912 | 7/1957 | Greger | 106—39 |
| 3,133,133 | 5/1964 | Fairbanks | 264—59 |

DONALD J. ARNOLD, Primary Examiner

J. H. MILLER, Assistant Examiner

U.S. Cl. X.R.

106—39, 45; 264—86, 87